United States Patent
Kumar et al.

(10) Patent No.: US 8,098,158 B2
(45) Date of Patent: Jan. 17, 2012

(54) RFID SERVER INTERNALS DESIGN

(75) Inventors: Anush Kumar, Seattle, WA (US);
Mohamed Fakrudeen Ali Ahmed, Coimbatore (IN); Janaki Ram Goteti, Hyderabad (IN); Vamshidhar G. R. Reddy, Redmond, WA (US); Balasubramanian Sriram, Sammamish, WA (US); Abhishek Agarwal, Hyderabad (IN); Ramachandran Venkatesh, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 2054 days.

(21) Appl. No.: 11/061,356

(22) Filed: Feb. 18, 2005

(65) Prior Publication Data

US 2006/0047464 A1    Mar. 2, 2006

Related U.S. Application Data

(60) Provisional application No. 60/606,281, filed on Sep. 1, 2004, provisional application No. 60/606,577, filed on Sep. 2, 2004.

(51) Int. Cl.
G08B 13/14 (2006.01)
(52) U.S. Cl. ...................... 340/572.1; 340/10.1; 235/375
(58) Field of Classification Search .................. 340/10.1, 340/572.1, 572.4, 5.9, 5.92; 705/22, 23; 235/375, 376, 377, 381, 385
See application file for complete search history.

(56) References Cited

U.S. PATENT DOCUMENTS

| | | | |
|---|---|---|---|
| 4,975,865 A | 12/1990 | Carrette | |
| 5,119,470 A | 6/1992 | Highland | |
| 5,644,770 A | 7/1997 | Burke | |
| 5,650,768 A | 7/1997 | Eswaran | |
| 5,862,325 A * | 1/1999 | Reed et al. | 709/201 |
| 5,910,776 A | 6/1999 | Black | |
| 5,949,335 A | 9/1999 | Maynard | |
| 6,088,717 A * | 7/2000 | Reed et al. | 709/201 |
| 6,158,010 A | 12/2000 | Moriconi | |
| 6,304,973 B1 | 10/2001 | Williams | |
| 6,405,261 B1 | 6/2002 | Gaucher | |
| 6,618,806 B1 | 9/2003 | Brown | |
| 6,631,363 B1 | 10/2003 | Brown et al. | |
| 6,677,852 B1 | 1/2004 | Landt | |
| 6,732,923 B2 | 5/2004 | Otto | |

(Continued)

FOREIGN PATENT DOCUMENTS

EP    11632893    3/2006

(Continued)

OTHER PUBLICATIONS

OA received Dec. 10, 2008 for Chinese Application U.S. Appl. No. 200510091693.0, 10 pages.

(Continued)

*Primary Examiner* — Edwin Holloway, III
(74) *Attorney, Agent, or Firm* — Workman Nydegger

(57) ABSTRACT

The subject invention provides a system and/or a method that facilitates implementing an RFID process by providing creation and/or execution of the RFID process as it relates to a provider(s) and the associated devices related to such provider(s). A receiver component can receive information relating to at least one or more providers. An RFID server component can employ the information in connection with providing an RFID process that can be applied generically to a plurality of devices associated with a subset of providers. An RFID engine can process an RFID event including an event processing tree that abstracts a logical entity, wherein the logical entity consists of a logical source can define the RFID process.

17 Claims, 12 Drawing Sheets

U.S. PATENT DOCUMENTS

| | | | |
|---|---|---|---|
| 6,784,802 | B1 | 8/2004 | Stanescu |
| 6,873,260 | B2 | 3/2005 | Lancos et al. |
| 6,908,034 | B2 | 6/2005 | Alleshouse |
| 6,943,683 | B2 | 9/2005 | Perret |
| 7,155,305 | B2 | 12/2006 | Hayes et al. |
| 7,204,409 | B2 | 4/2007 | Kumar et al. |
| 7,257,108 | B2 | 8/2007 | Cheston |
| 7,267,275 | B2 | 9/2007 | Cox et al. |
| 7,290,708 | B2 | 11/2007 | Haller |
| 7,295,116 | B2* | 11/2007 | Kumar et al. .............. 340/572.1 |
| 7,424,744 | B1 | 9/2008 | Wu |
| 7,426,484 | B2 | 9/2008 | Joyce |
| 7,640,547 | B2 | 12/2009 | Neiman |
| 7,640,574 | B1 | 12/2009 | Kim |
| 7,701,341 | B2* | 4/2010 | Kumar et al. .............. 340/572.1 |
| 7,756,747 | B2* | 7/2010 | Agarwal et al. ................. 705/23 |
| 7,756,969 | B1* | 7/2010 | Clarke et al. .................. 709/224 |
| 2002/0004787 | A1 | 1/2002 | Moshal |
| 2002/0059471 | A1 | 5/2002 | Sanghvi et al. |
| 2002/0070865 | A1 | 6/2002 | Lancos et al. |
| 2002/0095454 | A1* | 7/2002 | Reed et al. .................... 709/201 |
| 2002/0170952 | A1 | 11/2002 | Alsafadi et al. |
| 2003/0061062 | A1 | 3/2003 | Tucker |
| 2003/0132853 | A1 | 7/2003 | Ebert |
| 2003/0135576 | A1 | 7/2003 | Bodin |
| 2003/0144926 | A1 | 7/2003 | Bodin et al. |
| 2003/0225928 | A1 | 12/2003 | Paul |
| 2003/0227392 | A1* | 12/2003 | Ebert et al. .............. 340/825.49 |
| 2004/0046642 | A1 | 3/2004 | Becker et al. |
| 2004/0070491 | A1 | 4/2004 | Huang et al. |
| 2004/0102995 | A1 | 5/2004 | Boppana |
| 2004/0111335 | A1 | 6/2004 | Black et al. |
| 2004/0133484 | A1 | 7/2004 | Kreiner |
| 2004/0181461 | A1* | 9/2004 | Raiyani et al. .................. 705/26 |
| 2004/0193641 | A1 | 9/2004 | Lin |
| 2004/0215667 | A1 | 10/2004 | Taylor et al. |
| 2004/0233040 | A1 | 11/2004 | Lane |
| 2005/0033619 | A1 | 2/2005 | Barnes |
| 2005/0062603 | A1 | 3/2005 | Fuerst et al. |
| 2005/0068190 | A1* | 3/2005 | Krause ..................... 340/825.22 |
| 2005/0092825 | A1 | 5/2005 | Cox et al. |
| 2005/0119984 | A1 | 6/2005 | Rouvellou |
| 2005/0138402 | A1 | 6/2005 | Yoon |
| 2005/0150952 | A1 | 7/2005 | Chung |
| 2005/0150953 | A1 | 7/2005 | Alleshouse |
| 2005/0237194 | A1 | 10/2005 | VoBa |
| 2006/0047464 | A1* | 3/2006 | Kumar et al. ................. 702/122 |
| 2006/0047789 | A1 | 3/2006 | Kumar et al. |
| 2006/0053234 | A1* | 3/2006 | Kumar et al. .................... 710/11 |
| 2006/0116160 | A1* | 6/2006 | Fuccello .................... 455/556.1 |
| 2006/0195473 | A1* | 8/2006 | Lin et al. .................... 707/104.1 |
| 2007/0243925 | A1* | 10/2007 | LeMay et al. ................... 463/20 |

FOREIGN PATENT DOCUMENTS

| | | |
|---|---|---|
| JP | 2002-117298 | 4/2002 |
| JP | 2003288624 | 10/2003 |
| JP | 2004-217426 | 8/2004 |
| WO | WO03/060752 | 7/2003 |
| WO | WO 03/102845 | 7/2003 |
| WO | 03102845 | 12/2003 |
| WO | WO2004/066077 | 8/2004 |
| WO | WO 2005078633 | 8/2005 |

OTHER PUBLICATIONS

U.S. Appl. No. 11/192,877, filed Aug. 11, 2010.
U.S. Appl. No. 11/025,702, filed Feb. 18, 2005, Kumar, et al.
U.S. Appl. No. 11/061,337, filed Mar. 1, 2005, Kumar, et al.
U.S. Appl. No. 11/069,459, filed Feb. 18, 2005, Kumar, et al.
U.S. Appl. No. 11/061,356, filed May 31, 2005, Kumar, et al.
U.S. Appl. No. 11/141,619, filed May 31, 2005, Kumar, et al.
U.S. Appl. No. 11/140,726, filed May 31, 2005, Kumar, et al.
U.S. Appl. No. 11/141,533, filed May 31, 2005, Agarwal, et al.
European Search Report dated Oct. 2, 2006, mailed Feb. 10, 2006 for European Patent Application Seial No. 05107796, 6 pages.
Tsetsos, et al. "Commerical Wireless Sensor Networks: Technical and Business Issues" Proceedings of the Second Annual Conference on Wireless On-Demand Network Systems and Services (Jan. 19-21, 2005) 8 pages.
Branch, et al. "Sentire: A Framework for Building Middleware for Sensor and Actuator Networks" Proceedings of the Third International Conference on Pervasive Computing and Communications Workshops Mar. 8, 2005) pp. 396-400.
Harrison, et al. "Information Management in the Product Lifecycle-the Role Networked RFID" Proceedings of the Second IEE International Conference (Jun. 24, 2004) pp. 507-512.
Bornhovd, et al. "Integrating Smart Items with Business Processes An Experience Report" Proceedings of the Thirt-Eighth Hawaii International Conference on System Science (Jan. 3, 2005) 8 pages.
Ganesh, et al. "Web Services and Multi-Channel Integration: A Proposed Framework" Proceedings of the IEEE International Conference on Web Services (Jul. 6, 2004) 8 pages.
European Search Report dated Feb. 6, 2006, mailed Feb. 6, 2006 for European Patent Application Seial No. 05107826, 7 pages.
Ortiz. "An Introduction to Java Card Technology—Part 1" http://developers.sun.com/techtopics/mobility/javacard/articles/javacard1/> last viewed Dec. 19, 2005, 14 pages.
Chen. "Understanding Java Card 2.0" URL:.com/javaworld/jw-03-1998/jw-03-javadev_p.html> last viewed Dec. 19, 2005, 12 pages.
IBM "alphaWorks: RFID Device Development Kit: Overview" http://www/alphaworks.ibm.com/tech/rfiddevice last viewed Nov. 7, 2005, 1 page.
Alien "ALR-9800 Enterprise RFID Reader" http://www.alientechnology.com/docs/AT_DS_9800_v3_WEB.pdf last viewed Nov. 17, 2005, 4 pages.
Eurpoean Search Report dated Feb. 7, 2006; mailed Feb. 7, 2006 for PCT Application Serial No. EP 05 10 8001; 7 pages.
U.S. Appl. No. 11/141,533, filed Jun. 22, 2010.
European Search Report dated Oct. 4, 2006 and mailed Apr. 11, 2006 for EP 05108005, 9 pages.
Floerkemier, et al. "PML Core Specification 1.0" Sep. 13, 2003, Auto-ID Center, Version 1.0, 48 pages.
International Search Report dated and mailed Jul. 27, 2007 for PCT Application Serial No. PCT 2007/004005, 6 pages.
U.S. Appl. No. 11/140,726, filed May 31, 2005, Agarwal, et al.
U.S. Appl. No. 11/141,533, filed May 31, 2005, Kumar, et al.
U.S. Appl. No. 11/025,702, filed Dec. 29, 2004, Kumar, et al.
U.S. Appl. No. 11/061,337, filed Feb. 18, 2005, Kumar, et al.
U.S. Appl. No. 11/069,459, filed Mar. 1, 2005, Kumar, et al.
European Search Report dated Mar. 9, 2006 mailed Mar. 22, 2006 for European Patent Application Serial No. EP05107794, 7 pages.
Anonymous: "The Sun Global RFID Betwork Vision: Connecting Businesses at the Edge of Network" Internet Article, Jul. 2004, http://www.sun.com/software/solutions/rfid/Sun_RFIS_Vision_rla.pdf.
Author Unknown, "Does Your Project Need a Rule Engine", Copyright 2008 Sys-Con Media, Downloaded Oct. 13, 2009 <http://java.sys-con.com/node/45082/print>.
Office Action dated Jan. 5, 2010 cited in U.S. Appl. No. 11/141,533.
Notice of Allowance dated Jan. 12, 2010 cited in U.S. Appl. No. 11/061,337.
European Search Report dated May 11, 2006, mailed May 12, 2006 for European Patent Application Serial No. EP05107744, 9 pages.
European Search Report dated Mar. 09, 2006, mailed Mar. 27, 2006 for European Patent Application Serial No. EP05107744, 7 pages.
U.S. Appl. No. 60/606,281, filed Sep. 1, 2004, Kumar, et al.
U.S. Appl. No. 60/606,577, filed Sep. 2, 2004, Kumar, et al.
U.S. Appl. No. 11/192,877, filed Dec. 15, 2010, Office Action.
U.S. Appl. No. 11/141,533, filed Feb. 3, 2011, Notice of Allowance.
U.S. Appl. No. 11/192,877, filed Mar. 25, 2011, Office Action.
U.S. Appl. No. 11/192,877, filed Jul. 20, 2011, Office Action.

* cited by examiner

RFID SERVER INTERNALS DESIGN

CROSS-REFERENCE TO RELATED APPLICATION(S)

This application claims the benefit of U.S. Provisional Patent Application Ser. No. 60/606,281 filed on Sep. 1, 2004, entitled "SYSTEM AND METHODS THAT FACILITATE, RFID SERVER PROGRAMMING MODEL AND API'S," and U.S. Provisional Patent Application Ser. No. 60/606,577 filed on Sep. 2, 2004, entitled "FACILITATE RFID SERVER PROGRAMMING MODEL AND API'S." This application is also related to U.S. patent application Ser. Nos. 11/025,702, filed on Dec. 29, 2004 (now issued as U.S. Pat. No. 7,204,409), and Ser. No. 11/061,337, filed on Feb. 18, 2005 (now issued as U.S. Pat. No. 7,701,341). The entireties of these applications are incorporated herein by reference.

TECHNICAL FIELD

The subject invention generally relates to radio frequency identification (RFID), and more particularly to a system and/or a method that facilitates providing RFID communication, management, and/or execution of processes.

BACKGROUND OF THE INVENTION

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

One type of monitoring system relating to products is a portable image collection device (e.g., barcode reader), which is widely used in manufacturing, service and/or package delivery industries. Such devices can perform a variety of on-site data collection activities. Portable data collection devices often include integrated bar code dataform readers adapted to read bar code dataforms affixed to products, product packaging and/or containers in warehouses, retail stores, shipping terminals, for inventory control, tracking, production control and expediting, quality assurance and/or other purposes.

A unique bar code can be placed on a product, wherein the bar code can be associated with information relating to that product. A bar-code scanner can be utilized to scan the barcode on the product, and product related information can be retrieved threrefrom. Such identifying information, however, is aesthetically displeasing as such information can clutter the product. Moreover, tears, smudges, annotation or other physical damage/alteration to a barcode can render such conventional systems and/or methodologies substantially useless. If a portion of a bar code is torn from the product, a bar code scanner may not be able to correctly read the bar code. Similarly, a smudge on a product can render such barcode unreadable.

Monitoring systems and/or methods utilizing barcode readers and a universal product code (UPC) confront a user (e.g., retailer, distributor, manufacturer, . . . ) with additional complications. Barcode readers require a line of sight in order to properly monitor products. For example, a typical barcode system requires a scanner to be within 4-8 inches of a barcode and/or UPC to achieve a proper read. Not only does a barcode system require line of sight, manual scans are necessary on each individual product in order to identify the product. Moreover, a single barcode and/or UPC must represent all instances of a product (e.g., a bottle of ketchup of brand Tomato is designated a single UPC and/or barcode for representation of the product). In addition, the amount of information associated to the single barcode and/or UPC is limited. Thus, a scanning of brand Tomato ketchup can give the product identification and a price. Not only is the information insubstantial, but the information is not conducive to real-time product monitoring.

Automatic identification and data capture (AIDC) technology, specifically, Radio Frequency Identification (RFID) has been developed based at least upon the need to cure the above deficiencies of monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product. Therefore, in contrast to a barcode system, each bottle of ketchup made by brand Tomato would have an associated identification code. For example, two bottles of ketchup made by brand Tomato have two distinct identification codes associated thereto within an RFID system; whereas in barcode systems, the two bottles of ketchup made by brand Tomato would have the same barcode and/or UPC. In another example, RFID systems and/or methods can be implemented in water such as tracking and/or monitoring underwater pipe, whereas a barcode monitoring system presents numerous complications under such conditions.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and a RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between 125 to 134 kilohertz), high frequency tags (13.56 megahertz), UHF tags (868 to 956 megahertz) and Microwave tags (2.45 gigahertz).

Within the various frequency ranges, RFID tags can be either passive or active. A passive RFID tag does not include a power supply. When electrical current is induced in the antenna by the received radio frequency from an RFID transceiver, sufficient power is provided for the tag to respond. In many instances, the passive RFID tag response is brief, consisting of an ID number (e.g., Globally Unique Identifier (GUID)). A GUID is a pseudo-random number that is unique and can be implemented by a standard Universally Unique Identifier (UUID) (e.g., a 16-byte number written in hexadecimal format). However, RFID systems and/or methods have converged on storing information in, for instance, multi-bit format (e.g., 64 bit or 96 bit) called a electronic product code (EPC). The lack of power supply in the passive RFID tag allows the device to be small and cost-efficient. Some passive RFID tags are measured to be 0.4 mm×0.4 mm, with a thickness thinner than a sheet of paper. Yet, the absence of the power supply limits the practical read range of the passive RFID tag from 10 mm to about 5 meters.

An active RFID tag contains a power source providing longer read ranges. A typical active RFID tags are about the size of a U.S. currency coin, and provides providing read ranges of about tens of meters, while maintaining a battery life of up to several years. Furthermore, active RFID tags can be read and/or written. For instance, RFID tags can provide an additional security layer to deter theft by writing to an active RFID tag. A security bit can determine a security status based at least upon a RFID transceiver. In one security system, for example, an active RFID tag can have a security bit set/written to one, which can indicate the product is not cleared to leave a secure area without triggering an alarm/warning. Once the appropriate conditions exist, the RFID system and/or method can write the bit on the tag to a zero, which can indicate the tagged product is cleared to leave the secure area.

In general, an RFID system can include multiple components: tags, tag readers (e.g., tag transceivers), tag-programming stations, circulation readers, sorting equipment, tag inventory wands, etc. Moreover, various makes, models, types, and/or applications can be associated with respective components (e.g., tag, tag readers, tag programming stations, circulation readers, sorting equipment, tag inventory wands, . . . ), which can complicate discovery, configuration, setup, communication, maintenance, security, and/or compatibility within the RFID system and with other RFID systems. In view of the above, there is a need to provide a uniform way to discover, configure, setup, and communicate to RFID devices in respect to the maker and associated specifications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate implementing an RFID server component that implements an RFID business process, wherein the RFID business process is a business process definition including an input source of RFID events, a processing pipeline that acts on the events and a sink (e.g., a database sink, a file sink, a WS sink, etc., wherein a sink is a conceptual end-point and different such end-point can be implemented and/or plugged in based on user requirement) that stores the end result of the processing. It is to be appreciated that the RFID business process can be also known and/or referred to as an RFID process. A receiver component can receive data relating to at least one provider to convey the data to the RFID server component, which can instantiate an RFID process engine that is associated with the provider in order to execute the respective RFID process. The RFID provider can be a protocol translator and connection manager that is responsible for interactions between the software RFID system and the hardware device. The provider(s) can include a plurality of device vendors (e.g., reader vendors) that respectively provide at least one service to an associated RFID device, which typically utilizes a provider-specific command set. The RFID device can be a logical moniker for a physical device, wherein the RFID devices can be grouped into a collection. An RFID device collection can be a logical collection of device names and/or reference identifications. Thus, the RFID server component can receive data relating a plurality of providers via the receiver component and execute the RFID process to a multitude of devices, regardless of the provider-specific command sets.

In accordance with one aspect of the subject invention, the RFID server component can interact with at least one RFID provider. The RFID server component allows device vendors to provide services to the RFID server component in a uniform manner, based at least upon each device, which supports a different set of commands. A DSPI provider framework allows the RFID server component to interact with different devices in a uniform manner, and provides a device vendor a well specified contract that lets them cooperate with the RFID server component. Additionally, the DSPI manager component loads and/or unloads drivers of registered providers.

In accordance with another aspect of the subject invention, the RFID server component can include a device manager component that manages a device the RFID server utilizes. The device manager component can open connections to devices that are required for the RFID process to initiate; keep connections to devices open when they are required for the RFID process; when a required device goes down, attempt to reestablish a connection; throw an event if a device connection cannot be reestablished; connect to a discovered configured device; poll devices to reconnect; store device objects that represent open devices; and handle synchronous calls to devices.

Furthermore, the RFID server component can include a server manager component and/or a security manager component. Such server manager component can control a lifecycle of the RFID server component and/or associated components therein. The lifecycle of the RFID server component can be determined based at least upon a lifecycle of an operating system service. Moreover, the server manager component instantiates components in the appropriate sequence. The security manager component can provide authorization and/or verification for the RFID server component and/or incorporated components therewith. The security manager component can authorize permissions before executing a process. Moreover, the security manager component can provide authorization before adding, modifying, configuring, and/or deleting an object from a store.

It is to be appreciated that communications involving the RFID server component and/or any other components (incorporated therein, and/or associated thereto) can utilize an interface associated with the component requesting such communication. By utilizing an interface that contains methods specific to a particular communication, the dependencies between components can be clearly identified.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
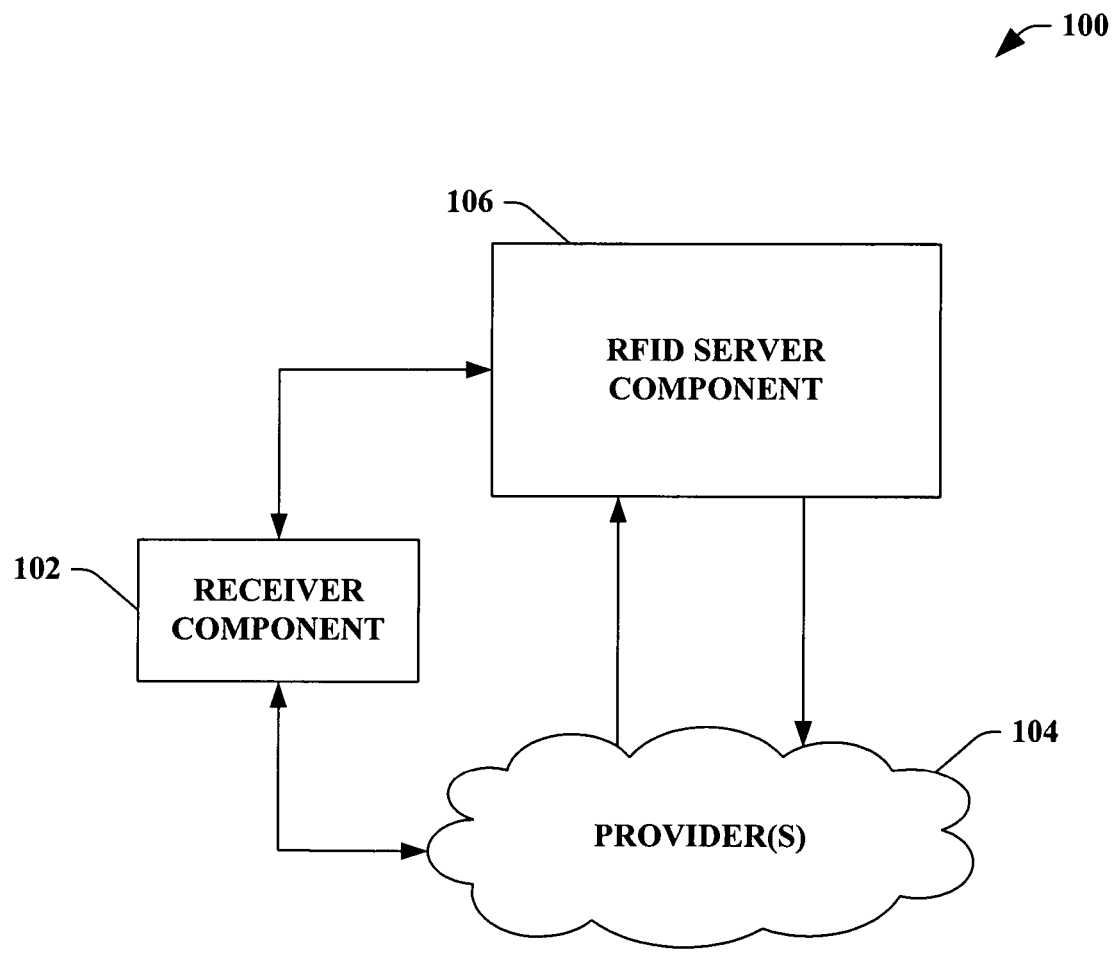
FIG. 1 illustrates a block diagram of an exemplary system that facilitates execution of a process within an RFID server.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates implementing an RFID process through creating and/or executing the RFID business process, wherein the RFID business process is a business process definition including an input source of RFID events, a processing pipeline that acts on the events and a sink (e.g., a database sink, a file sink, a WS sink, etc., wherein a sink is a conceptual end-point and different such end-point can be implemented and/or plugged in based on user requirement) that stores the end result of the processing. It is to be appreciated that the RFID business process can be also known and/or referred to as an RFID process. A receiver component 102 can receive data related to a provider(s) 104 (e.g., a device vendor providing a service, EPC-G compliant provider, proprietary provider, legacy provider, . . . ), wherein an RFID server component 106 can utilize such data to formulate an RFID process engine associated with the provider 104 to provide the RFID process. Additionally, the RFID provider can be a protocol translator and connection manager that is responsible for interactions between the software RFID system and the hardware device. The RFID process can be, but is not limited to, an RFID device service, a tag read, an event (discussed infra), a tag write, a device configuration, a geographic tracking, a number count, etc.

It is to be appreciated that the RFID process can be associated with devices that belong to individual providers within the provider(s) 104. For example, the provider(s) 104 can be a plurality of device vendors (e.g., reader vendors) that provide service to RFID devices. In another example, the RFID process can be configured to consume events form a device collection, and zero or more upstream RFID processes. Thus, the process can be created to operate upon events, and enrich them successively in a pipelined fashion. The service provided to the RFID devices allows functionality involving, but is not limited to, tag reads, tag writes, tracking capability, etc. In other words, there is a tremendous amount of flexibility in configuring an input to the RFID process.

It is to be appreciated that a plethora of providers can be utilized in conjunction with the subject invention. The provider(s) 104 can be, but are not limited to, an EPC-Global compliant provider, a proprietary provider, a legacy provider, wherein each provider is registered for one or more related device. The provider(s) 104 typically utilize a particular set of commands relating to the provider-specific devices. For instance, the EPC-Global can be associated to EPC-G devices, wherein an RFID process can be created and/or executed accordingly; an RFID process can be tailored to the proprietary provider registered for auto-identification devices; and an RFID process can be particular to the legacy provider registered for legacy devices.

Although the receiver component 102 is depicted as a separate component, it is to be appreciated that it can alternatively be implemented within the RFID server component 106 in order to receive the provider data. The provider data received can be, but is not limited to, data related to a particular provider that has at least one device associated therewith, authentication data, device data, device configuration, tag read data, tag write data, a unique identification, a description of the provider, a version of the provider, etc. Upon receiving the data from the provider(s) 104, the receiver component 102 can provide the RFID server component 106 with such data, which allows the employment of at least one RFID process to at least one provider within the provider(s) 104. Although the RFID server component 106 and the provider(s) 104 are depicted to utilize bi-directional (full duplex) communication, it is to be appreciated such depiction is not so limiting on the subject invention. The provider(s) 104 and the RFID server component 106 can utilize a uni-directional communication to facilitate interaction.

For instance, the receiver component 102 can acquire data relating to the provider(s) 104 that contains, but is not limited to, RFID data from a device, device configuration data, provider related data, etc. The receiver component 102 can convey the received and/or acquired data to the RFID server component 106, wherein at least one RFID process engine can be created in order to execute the RFID process for a particular provider within the RFID server component 106. Additionally, the provider can provide communication with the device on behalf of the RFID server component 106 and/or the RFID process. It is to be appreciated that a plurality of RFID processes can be employed to a particular provider. Moreover, the RFID server component 106 can employ a processes or providers 104. For instance, the RFID server component 106 can provide N number of processes that refer to devices for a first provider, M processes that refer to devices for a second provider, O processes that refer to devices for a third provider, . . . , wherein N, M, and O are integers equal to or greater than one. It is to be appreciated that the example utilizes three providers, yet the subject invention is not so limited to the number of providers to which processes can be provided.

In addition to providing RFID processes, the RFID server component 106 can employ a function(s) that is auxiliary to production and/or distribution of such RFID process. Upon collecting the data from the receiver component 102, the RFID server component 106 can provide management for device service provider(s), component communication via interfaces, device management, event management from a device and/or device manager, filtering and alerting via a rule engine, RFID server management, security, data store(s), data store(s) management, log capability, . . . . Within the RFID server component 106, it is to be appreciated that interfaces provide communications in order to utilize various functionality. For example, in order to manage devices within the RFID server component 106, a device manager component can be employed. In order to communicate with a DSPI provider manager component (not shown), an interface is exposed. Such interface contains specific protocols, adapters, methodologies, etc. for communication between the DSPI provider manager component and the device manager component. Thus, by utilizing specific methods to the communication between the components, dependencies between such components are clearly defined.

Figure 2:
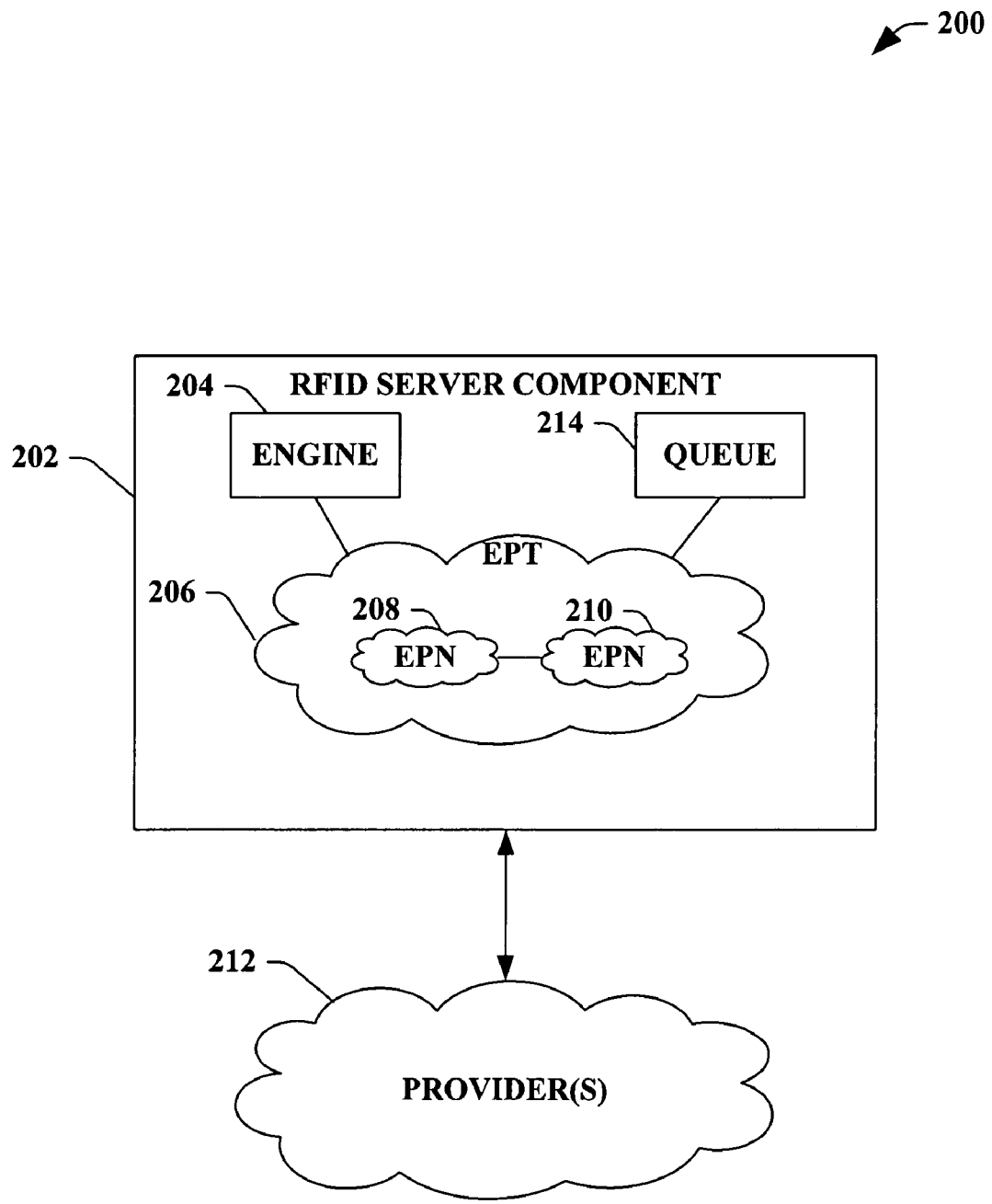
FIG. 2 illustrates a block diagram of an exemplary system that facilitates execution of a process associated with a provider and a RFID device.

FIG. 2 illustrates a system 200 that facilitates executing an RFID process by separating a physical event generation from a device and consuming it and executing in a server application layer (e.g., a logical processing layer). An RFID server component 202 can include an RFID engine 204 that can be responsible for an RFID event processing. An event processing tree (EPT) 206 can be an abstraction that can bring together all logical entities such as a tag data source (e.g., a reader), a filter, a rule, an alert, an event handler, a tracking option, and a sink. It is to be appreciated that the above can collectively define an RFID-enabled business process (also referred to as an RFID process, and/or an RFID business process).

The EPT 206 can include at least one or more event processing nodes (EPN) 208, and 210 that can be communicatively coupled. It is to be appreciated that each EPN can include the following: an event source collection (e.g., a collection of event sources for input events in a specified event format, which also can act as an event aggregator across multiple sources); a filter (e.g., utilized to drop unwanted tags based upon constraints that can drive off what is in the tag or some logic known to the EPN with simple lookups); an alert (e.g., a user-defined rule that can be evaluated against data streams and causes appropriate alerts to be fired); a transformation (e.g., an optional event handler that can transform tag data into value-added business-relevant data, such that input event and external factors can be interpreted to provide useful context to higher order applications); and an event sink or output for the processing node.

It is to be appreciated and understood that the EPN 208 and EPN 210 are the transparency of the sources, filters and transforms. Event source collection and event sinks are strongly typed. The transparency can provide selectivity of the EPN and the safety with which it can be analyzed and combined. Filters and alerts are specified via a declarative rule framework and executed on an in-memory rules engine or a database. This can provide agility in management and also reduce process downtime caused by re-compilation or deployment.

The EPN 208 and 210 can be strung together recursively in an n-ary tree to form the EPT 206. This can be substantially similar to an iterator model in a relational database query with an optional filter and optional transformational step on top of a data source collection. Furthermore, alerts are a side effect outside the relational query model. It is to be appreciated and understood that the architecture and/or RFID server component 202 can support a plurality of API's through with ISV's and SI's can create and deploy the EPT 206.

Moreover, a provider(s) 212 can deposit the RFID event into a queue 214 from which events can be dispatched and the corresponding event processing trees can be executed. The EPT 206 can be executed as one transaction unless specified otherwise, thus providing reliable non-duplicate delivery and processing of the RFID event. The transaction can include de-queue of the event from the dispatch queue, processing through various EPN's and the final deposit of the processed event in the sink. Custom alerts, filters, and transforms can participate in the transaction. Batch processing events can also be supported. For example, the events can be accumulated in the queue 214 and processed at regular intervals in a transaction batch. The execution engine is also instrumented to log any tracking data necessary, based at least in part upon the tracking options established in the EPT 206. It is to be appreciated that the execution of the EPN 208 can vary. In one example, the EPN 208 is executed by invoking a business rules engine (BRE). Filters, alerts, and transforms are components strung together via rules engine (RE) policies. However, execution of EPN's can be inside a database to reduce the roundtrips across processes due to the proximity to data.

Furthermore, by utilizing the subject invention, a flexible deployment based upon application specific constraints can be employed. By separating the logical event processing form the binding of the same to processing nodes, the flexible deployment is achieved. The EPT 206 is a logical description of event processing. The physical manifestation of the same is done at deployment via the binding process. The EPT 206 is represented in persisted form as a well-defined XML whose event sources are not instantiated. Similarly, there can be an XML representation of a physical device topology (e.g., a list of devices and their configuration—either automatically discovered or manually created). The binding process can allow an administrator to assign a specific device from the device topology to specific sources in the EPT 206. It is to be emphasized and appreciated that the separation of the logical and physical representations is important because of: 1) The enablement of a write-once independent software vendor (ISV) model where the same logical EPT can be deployed in different environments with different reader topologies; and 2) Providing a dynamic optimization of the network at deployment based on reader capabilities. For example, a low filter can be pushed into the device if the device has the capability to filter events at source thereby reducing network bandwidth.

Figure 3:
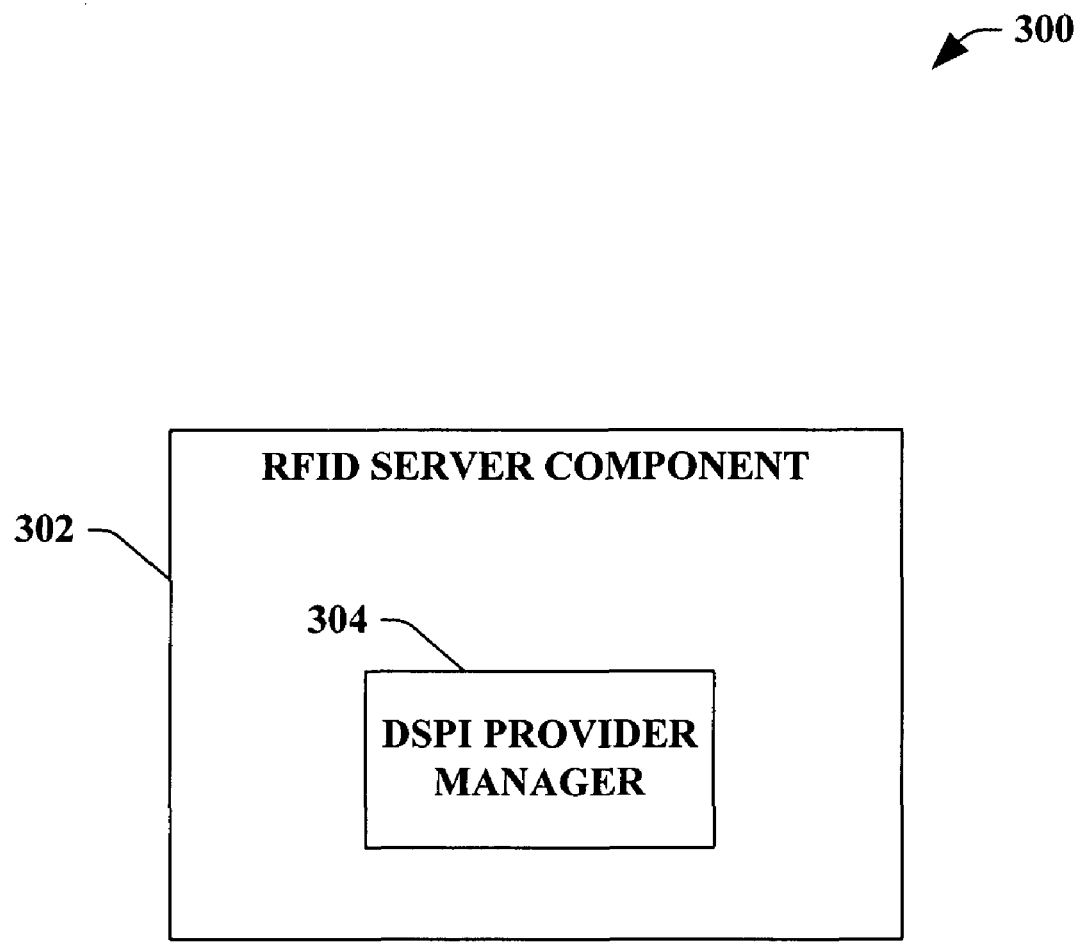
FIG. 3 illustrates an RFID based system that facilitates implementation and/or execution of a process within a related server.

FIG. 3 illustrates a system 300 that facilitates implementing an RFID process by employing an RFID process engine to provide such RFID process to a provider that is registered to a device. An RFID server component 302 can be utilized to implement the RFID process. The RFID server component 302 can be, but is not limited to, substantially similar to the RFID server component 202 and RFID server component 102 of FIG. 2 and FIG. 1 respectively. Furthermore, the RFID server component 302 can utilize a receiver component (not shown) to obtain and/or receive data in order to employ at least one RFID process. The RFID server component 302 can provide for various functionalities. It is to be appreciated that communications regarding such functionalities are implemented by interfaces. These interfaces provide communication between components within the RFID server component 302 that employ functionalities such as, but are not limited to management for device service provider(s), component communication via interfaces, device management, event management from a device and/or device manager, alerts, RFID server management, security, data store(s), data store(s) management, and/or log capability.

The RFID server component 302 can further include a DSPI provider manager component 304 that provides management and coordination between at least one DSPI component (not shown), which can be substantially similar to one of the DSPI components 204 depicted in FIG. 2. The DSPI provider manager component 304 implements the functionality of subscribing and/or unsubscribing. Registration and/or unregistration functionality for a provider is managed by the DSPI provider manager component 304. For instance, an EPC provider can register with the RFID server component 302, in order for an RFID process to be implemented. In particular, the RFID server component 302 can achieve the ability to communicate, control, configure, and/or manage with an EPC compliant device. It is to be appreciated that any provider and associated devices can be registered and/or unregistered utilizing the DSPI provider manager component 304, wherein an EPC provider is merely an example and is not limited to such.

For instance, the DSPI provider manager component 304 can implement an interface (e.g., IDriverManager interface) specified in an object model in order to employ registration and/or unregistration functionality for a provider. Furthermore, the DSPI provider manager component 304 can load and/or unload at least one registered driver. This loading and/or unloading can be implemented by exposing an interface (e.g., IProviderFactory interface). It is to be appreciated that before unloading a driver, the DSPI provider manager component 304 can ensure there is no open device created from that particular provider (e.g., the provider that which the driver will be unloaded). Furthermore, a component that interacts and/or communicates with a provider (e.g., device manager component, event routing engine, both discussed infra) utilizes the interface to load and unload driver(s) (e.g., IProviderFactory interface), which contains appropriate communicative methods.

Upon registration, the DSPI provider manager component 304 can further instantiate at least one provider at startup in order to discover new devices. For instance, the following pseudo-code can be employed in order to instantiate a registered provider and discover devices within the particular provider:

```
interface IProviderFactory {
    IProvider GetProvider(string ProviderId);
    //
    Void AddRefProvider(string ProviderId);
    Void ReleaseProvider(string ProviderId);
    Void addDiscoveryEventListener(DiscoveryEventHandler
    discoveryEventHandler); // discovery event handler
}
```

It is to be appreciated that the above code variable references are example, and such variable references are not limiting upon the subject invention (e.g., IProviderFactory, ProviderId, . . . ).

Figure 4:
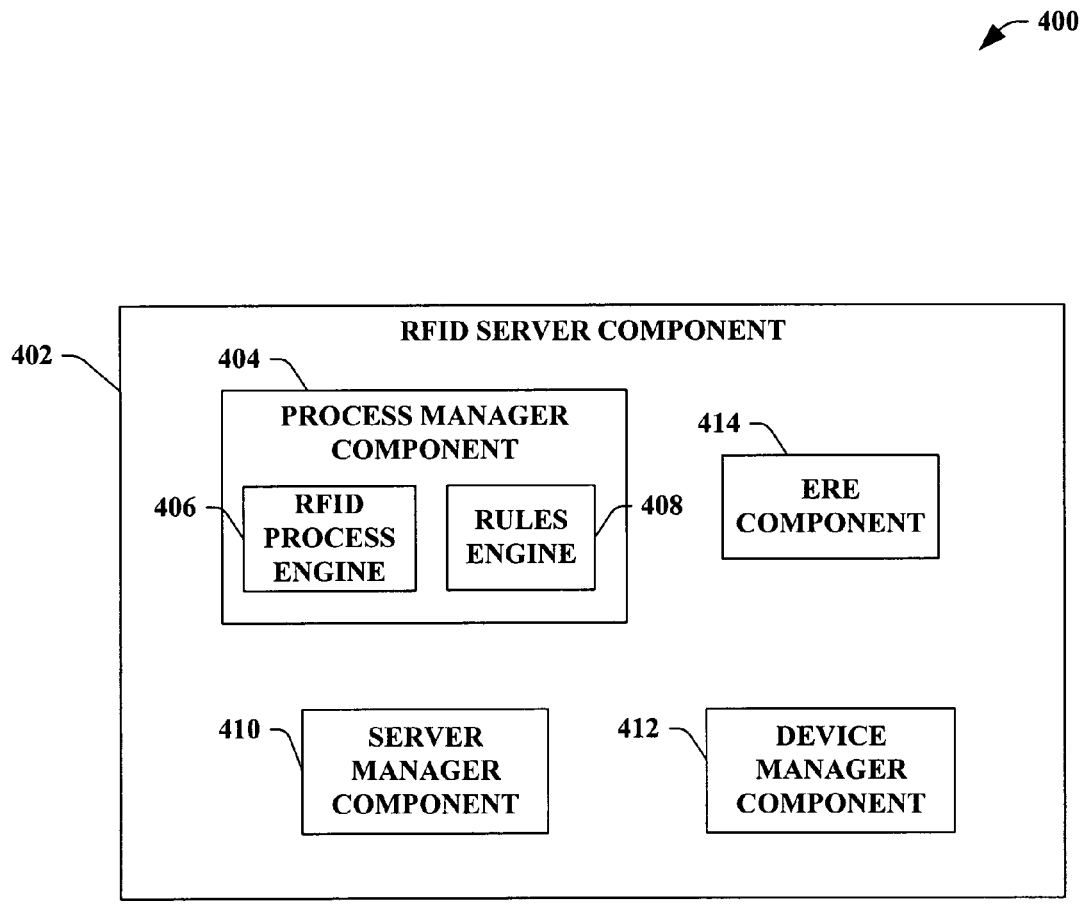
FIG. 4 illustrates a block diagram of an exemplary system that facilitates management of RFID communication.

FIG. 4 illustrates a system 400 that facilitates implementing an RFID process to a device that is registered to a provider. An RFID server component 402 can provide for execution of an RFID process. It is to be appreciated that the RFID server component 402 can be substantially similar to the RFID server component 302 in FIG. 3, wherein functionality and/or characteristics are incorporated herein. In order to create and/or execute an RFID process, a receiver component (not shown) can intercept, obtain, receive, convey and/or transmit data related to at least one provider registered with at least one device, wherein the device can be, but is not limited to, an RFID device, a sensor, a web-service, . . . . Furthermore, the RFID server component 402 can implement various functionalities utilizing at least one component, wherein the components communicate via a respective interface.

The RFID server component 402 can further include a process manager component 404 that can include an RFID process engine 406. Although the process manager component 404 is depicted to contain a single RFID process engine 406, it is to be appreciated that a plurality of RFID process engines 406 can be contained by a process manager component 404. In addition, the process manager component 404 provides management to such RFID process engines 406. Furthermore, the process manager component 404 can implement an interface class (e.g., IProcessManager class) through which RFID processes can be initiated and/or terminated (e.g., started and/or stopped).

The RFID process engine 406 is created for each RFID process started by the process manager component 404. Upon creation, the RFID process engine 406 executes the RFID process. Such execution can include verification and/or authentication relating to security, loading the RFID process from a store, establishing communication with a device, configuring a device, subscribing to an event, utilizing an event routing engine, passing an event upon occurrence to appropriate components within the process, and/or interpreting a logical source and associated flow to execute thereto.

For instance, the RFID process engine 406 can make the necessary connections between filters, alerts, event handlers, etc. It is to be appreciated that this can be represented as a static data structure. If a logical source (e.g., LS1) has a reader (e.g., D1) followed by a filter (e.g., F1) and an event handler (e.g., EH1) and is incorporated into a larger logical source (e.g., LS2), the data structure will have a reference from R1 to F1 and then to F1 to EH1, and then to LS2. The structure contains a flow of events emanating from each device. The logical source can be a main active entity in the RFID process, which can wrap other components and/or links them logically. Every logical source contains a set of filters, a set of alerts and an event handler. It includes a set of sources for getting tag read events into logical source. It has a single output point, which is defined as the output of the last component. Every logical source is also a node in the logical sources tree with its sources as children and the consumer of its output as the parent. A filter is a logical construct that is executed on raw data streams. The filter(s) can drop unwanted tag reads based on certain defined constraints (e.g., pallet, case, item, . . . ) and/or allow certain tag reads. An alert is a more generic mechanism to express simple rules that can be evaluated against data streams. Alerts are expressed as a set of logical rules grouped into a policy, and can be evaluated against multiple events including a tag read event. The actions of these rules are normally to execute one or more user defined/alerts. For example, if a tag read is registered between 6 P.M. and 6 A.M. by a logical source, then sound the alarm and alert the building supervisor via a message. Alerts can be optional constructs as well. It is to be appreciated that any suitable programming language can be implemented to utilize such logical source(s) such as, but are not limited to, C, C++, C#, HTML, HXML, etc. The following pseudo-code is an extensible markup language (XML) example that can be utilized to represent a logical source:

```
<xs:complexType name="LogicalSource">
    <xs:sequence>
    <xs:element minOccurs="0" maxOccurs="1" name=
    "logicalSourceList"
type="ArrayOfLogicalSource" />
    <xs:element minOccurs="0" maxOccurs="1"
name="deviceCollectionList" type="ArrayOfReaderCollection" />
    <xs:element minOccurs="0" maxOccurs="1" name="componentList"
type="ArrayOfChoice1" />
    </xs:sequence>
</xs:complexType>
```

Furthermore, each RFID process engine 406 can utilize a queue (not shown). The queue can be associated to the RFID process engine 406 providing all relevant events to be sent by the event routing engine. As specifically detailed infra, it is to be appreciated that the event queue is separate from the logical processing pipeline (e.g., the physical device communication layer with the logical processing).

The queue maintains a list of logical sources for each device, and has a thread pool associated therewith. The number of threads in the pool is configured based at least upon requirements of the RFID process. Additionally, a separate thread can monitor the process engine queue. It is to be appreciated that any suitable code can be utilized to implement the above, although the following examples of pseudo-code are XML. The following code can be implemented to utilize an algorithm in which the separate thread monitors the process engine queue:

```
do forever{
    wait on Process Engine Q;
    onevent, check the device that the event is from;
    foreach logical source that the device is part of
```

-continued

```
    {
        Wait till a thread is free in the thread pool;
        Start the thread and give it the event to handle and the logical
source to start from;
    }
}
```

In addition, a worker thread can be utilized in the thread pool, wherein each thread pool can execute the following algorithm:

```
nextlink = logicalsource.firstlink;
while (nextlink != null) {
if the nextlink is a logical source
    nextlink = logicalsource.nextlink; continue;
If the link is a filter
{
    execute it.
    if the filter decides to pass
        nextlink = nextlink.nextlink;
    else nextlink = null; continue;
}
If the link is an alert, pass the event to the general purpose rules engine;
If the link is an event handler invoke the right event. This event might
result in invoking the event of the next event handler in the event handler
chain.
Nextlink = nextlink.nextlink;
}
```

It is to be appreciated that the RIFD process engine 406 created for each RFID process can be executed on a plurality of machines, wherein such machines are together, separate, and/or a combination thereof. The subject invention is not limited as such as to the amount of machines that execute the created RFID process engine 406 related to RFID processes. Furthermore, communications between an RFID process engine 406 and the RFID server component 402 are events received from a message queuing center. Thus, the RFID process engine 406 can access the message queuing center from any location.

Additionally, interactions can be modified in order to distribute the architecture as depicted and illustrated infra. This can be achieved by allowing the RFID processes to be exposed as a web-service, thus merging a service orientated architecture (SOA) approach with an electronic design automation (EDA) approach. This can enable a distributed, stackable approach for processes, where the end-point can be a sink or another process.

The process manager component 404 can further include a rules engine 408. The rules engine can be a general purpose rules engine for the RFID server component 402 that provides, for instance, filtering and alerting. Alerts within the RFID server component 402 can be executed synchronously and/or asynchronously. In other words, the thread invoking the alert is not required to wait until the thread is completed. The worker thread can pass an event to the rules engine 408 and proceed to handle the next link. The rules engine 408 can have a thread pool associated thereto. Moreover, this pool can be configured to contain one or more additional threads.

The RFID server component 402 can further include a server manager component 410. The server manager component 410 provides managerial functionality to the RFID server component 402. In other words, the server manager component 410 is responsible for initializing the RFID server component 402 and various other components that provide further functionality. The server manager component 410 can further control a lifecycle of the RFID server component 402.

Additionally, the server manager component 410 can provide one or more sets of commands such as, but are not limited to, system identification, Internet protocol (IP) monitoring, dynamic host configuration protocol (DHCP) monitoring, network interface monitoring, device characteristics monitoring, logical sources monitoring, reader point (e.g., physical data source) monitoring, RF antenna monitoring, IO port monitoring, notification events (e.g., alarms), miscellaneous component monitoring, etc. In order to communicate, the server manager component 410 can utilize an interface (e.g., as does any component within the RFID server component 402). The interface (e.g., service control manager interface) allows the RFID server component 402 to be started and/or terminated as, for instance, an operating system service. It to be appreciated that the server manager component 410 can utilize and/or support such an interface compatible with the RFID server component 402 and any component therewith. For instance, an ILifeCycle interface can be utilized to control creation and destruction. Thus, the server manager component 410 can be a bootstrap component of the RFID server component 402 that creates all other components in the required order.

For instance, during a startup of an operating system service, the server manager component 410 can instantiate all manager components in the correct order. Thus, if a device manager component requires a DSPI manager component, the server manager component 410 can instantiate the DSPI manager component first and subsequently passes a reference to the DSPI manager component to the device manager component. The server manager component 410 can determine the necessity of a component, and instantiate such component. Furthermore, the server manager component 410 can shut down components during the shutting down of the operating system service. Following the previous example, upon the operating system service shutdown, the server manager component 410 closes (e.g., shuts down) the device manager component, DSPI manager component, and any other components, managers, and/or stores.

Furthermore, the RFID server component 402 can include a device manager component 412. The device manager component 412 can work in conjunction with at least one registered provider in order to manage any or all of the devices (e.g., readers, writers, . . . ), which the RFID server component is utilizing. It is to be appreciated that more than one provider can be registered, wherein respective providers can contain devices providing the RFID server component 402 with a plurality of devices to manage. The management of such devices can include, but is not limited to, opening connections, ports, etc. to devices for an RFID process to initiate, keeping connections to devices open for an RFID process, when a required device goes down, attempt to re-establish a connection, throw a device down event if a device connection cannot be re-established, connect to a discovered (e.g. rebooted manually, repaired and reconnected, etc.) configured device and throw a device up event, poll devices to reconnect (e.g., when an open device goes down and discovery is not supported by the provider), store device objects that represent open devices (e.g., such objects can be utilized to send command, deal, etc. with devices directly), handles synchronous calls to devices, . . . .

An interface can be employed in order to provide communication to other components by the device manager component 412. For instance, an IDiscoveryManager interface for the device manager component can abstract the communication between a design handler component (not shown) and the device manager component 412. For instance, the following XML-based code demonstrates the use of such an interface:

```
interface IDiscoveryManager {
    bool IsValidDevice (string deviceIdXml);
}
```

Additionally, the RFID process engine 406 can utilize the following interface to communicate with the device manager component 412. For example, when an RFID process starts, the associated RFID process engine 406 calls a method on any or all interested (e.g., affected) devices. As depicted in the code below, such a method implementing the above can be utilized:

```
interface IRMPE {
    void AddrefDevice (string DeviceIdXml);
    void ReleaseDevice (string DeviceIdXml);
}
```

When the RFID process stops, a method is employed to release the devices (e.g., such a method is illustrated with the reference ReleaseDevice). It is to be appreciated that as long as there is at least one reference to a device, the device manager component 412 can maintain the coinciding connection. Furthermore, the device manager component 412 can utilize an interface (e.g., IProvider interface) that exposes a subset of the ISPI interface that is related to the DSPI component (e.g., such as the DSPI component 204 of FIG. 2). The device manager component 412 can create devices and check the validity of the device by verifying an identification sequence. Furthermore, it is to be understood that the device manager component 412 does not have to invoke all the methods on the ISPI interface, thus all of the methods are not necessarily exposed on the ISPI. The following XML code is an example implementing the above:

```
Interface IProvider {
    IDevice GetDevice (string deviceIdXml);
    bool IsValidDevice (string deviceIdXml);
}
```

The RFID server component 402 can further provide an event routing engine (ERE) component 414. The ERE component 414 can handle events emanating from the devices and the device manager component 412. The events can be, but are not limited to, tag read events, tag read/write errors, device up/down events, etc. A component within the RFID server component 402 that utilizes an event can subscribe to such event(s) with the ERE component 414. Furthermore, the ERE component 414 manages and/or handles delivery of the events to any subscriber (e.g., any component that utilizes a subscribed event). For instance, the RFID process engine 406 is a subscriber to events based at least upon the functionality described above. In addition, it is to be appreciated that the ERE component 414 does not add a reference to the provider, but utilizes a method (e.g., addDiscoveryEventListener) in the interface to register itself to the providers.

The ERE component 414 can employ an interface (e.g., IDeviceEventSubscriber interface) to register a call back to tag read events and device management events such as a device health event. A callback handler (not shown) can write events to a message queuing center. A new event can be in the queue (e.g., CommonQ). Another thread writes it to a data store (not shown) and can send the event to another message queuing center based at least on the following: discovery events are sent to a discovery queue (e.g., DiscoveryQ); there is a queue for each RFID process engine 406 such as, but is not limited to, device related events (e.g., tag reads, management event, and health events) are sent to relevant RFID process engine queues; . . . . It is to be understood that the ERE component 414 can maintain a table with device to RFID process engine mapping. Moreover, it is to be appreciated that more than one RFID process engine can utilizing a device.

In accordance with an aspect of the subject invention, the queue (e.g., a CommonQ) can act as a buffer before events from the providers are sent to the RFID process engine 406. The devices and/or providers can act as producers of events, while the RFID process engines 406 can be consumers of such events. This approach provides advantages such as, but are not limited to: the RFID process engines can run user code that can throw exceptions, wherein the user code can be restarted with a next event as an input; listening to events (e.g., by each device) and processing the events can occur at different rates; etc.

The ERE component 414 can utilize the following XML code in order to implement an interface to communicate with the RFID server component 402 and/or other components:

```
interface IEventRoutingEngine {
void SubscribeToDeviceEvents(string[ ] deviceIds, string queueName);
//each RFID process engine will call this
void SubscribeToDiscoverEvents(string discoveryQueueName); //the
design handler component calls this
}
// this subscriber gets both the tag read events directly from providers and
//device management events generated by the device manager component.
the interface IDeviceEventSubscriber {
    ResponseEvent getEventHandler( );
}
```

It is to be understood the above sample of code is simply an example and the subject invention is not so limited.

Figure 5:
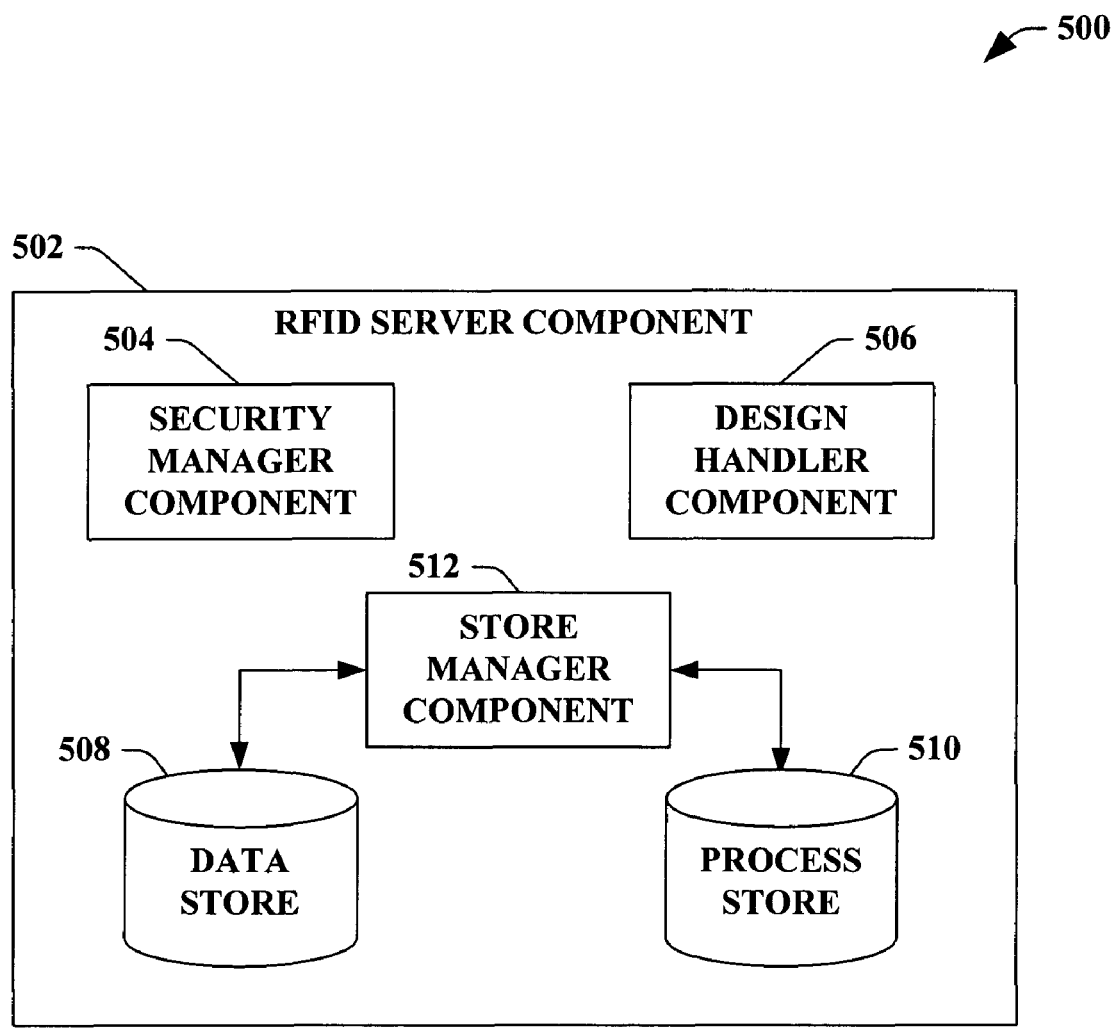
FIG. 5 illustrates a block diagram of an exemplary system that facilitates communication within an RFID server.

FIG. 5 illustrates a system 500 that facilitates implementing an RFID server component 502 to provide an RFID process to a provider registered with at least one device such as, but is not limited to, an RFID device, a sensor, a real-time event generating system, a web-service, . . . . The RFID server component 502 is to be considered substantially similar to the RFID server components illustrated in FIG. 1, FIG. 2, FIG. 3, and FIG. 4. The functionality described previously pertains to the RFID server component 502 (e.g., interface implementation relating to communication, component functionality capability, RFID process employment, . . . ).

The RFID server component 502 includes a security manager component 504, which provides authorization and/or verification for the RFID server component 502. In order to incorporate an authorization procedure into the RFID server component 502, the security manager component 504 can provide usable classes and/or methods for components within the RFID server component 502 to facilitate controlling authorization and/or accessibility.

By way of example, the security manager component 504 can check a user permission level before executing an RFID process. If the user has the appropriate permission level, the RFID process can be executed. However, if the user does not have the permission level required, the RFID process may not allow the execution of the RFID process. Furthermore, the security manager component 504 can establish permissions regarding objects within a store (discussed infra). In particular, the security manager component 504 can authorize and/or unauthorized a manipulation of an object within the store. The manipulation can be, but is not limited to, addition, modification, deletion, configuration, etc. to an object.

The RFID server component 502 can include a design handler component 506 that discovers a device(s) and/or properties associated therewith. An interface (e.g., IDeviceHandler interface) can be exposed to provide such methods and/or techniques by utilizing the following code:

```
public enum DiscoverOptions {ALL = 0, NON_CONFIGURED
DEVICES}
public interface IDeviceHandler {
    string[ ] FindDevices (DiscoveryOptions discoveryOptions);
    string GetSupportedProperties (string deviceId);
    bool IsValidId(string DeviceId);
}
```

The code above is XML-based, yet it is to be understood that any suitable computer programmable language (C, Visual Basic, Assembly, Pascal, . . . ) can be implemented by the subject invention and should not be seen as a limitation. The above XML code can return a list of device ID's that allow the connection of such devices. The devices can be filtered (e.g., utilizing "DiscoverOptions enum"). Furthermore, the code can return a list of supported properties on the devices corresponding to the device with the device ID, wherein the return value is an XML string conforming to a property file. It is to be understood that the device properties are specific to the device ID discovered. The code determines if the ID represents a valid device (e.g., connectable device). For instance, a device can be invalid if the device is offline, down, unsubscribed, unauthorized, etc.

In particular, the design handler component 506 can provide the following: listen to device discovery agents (e.g., DiscoveryQ within the ERE component); aggregate of the device discovery agents; determine validity of devices and/or remove false devices (e.g., utilize a method, such as IsValidDeviceO); return non-configured devices by communicating with a store, and/or remove configured devices; etc. For instance, the design handler component 506 can discover a device, such as an RFID device, wherein such RFID device contains specific properties associated thereto. In addition to discovery of a device, the design handler component 506 can discover the specific properties that relate to the discovered device.

The RFID server component 502 can further include a data store 508 and/or a process store 510. The data store 508 can retain and/or store events. In particular, events such as, but are not limited to, tag read events, tag read/write error, device up/down events, etc. It is to be appreciated that the data store 508 can be utilized in order to provide a log that can be used for reporting and/or providing a raw event stream (e.g., to an external application for plug-ability). Moreover, the data store 508 can be updated and/or cleaned periodically based at least upon a lifetime of the data.

The process store 510 can retain and/or store RFID process object(s) and/or associated objects that are referred thereto. Such associated objects can be, but are not limited to device and/or device collections (e.g., a reader and a reader collections). Furthermore the process store 510 contains authorization information relating to such stored/retained objects. It is to be appreciated that any persistence mechanism that supports an interface (e.g., IStore interface) can be a process store. Additionally, the objects in the process store 510 can be read and/or manipulated by utilizing a defined object model (e.g., where the object model is not housed by any component in the server and is an independent assembly that one or more users can use simultaneously).

It is to be appreciated that the data store 508 and/or the process store 510 can be located within the RFID server component 502 and/or located on a remote server/location. The data store 508 and/or the process store 510 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 508 and/or the process store 510 of the subject system and method is intended to comprise, without being limited to, these and any other suitable types of memory.

A store manager component 512 can manage and/or handle connectivity to at least one of the data store 508 and the process store 510. The store manager component 512 can serve as a wrapper around each store. Furthermore, the store manager component 512 can ensure the connections to each store are available. It is also to be understood and appreciated that store activity between the data store 508 and the process store 510 is routed through the store manager component 512.

Figure 6:
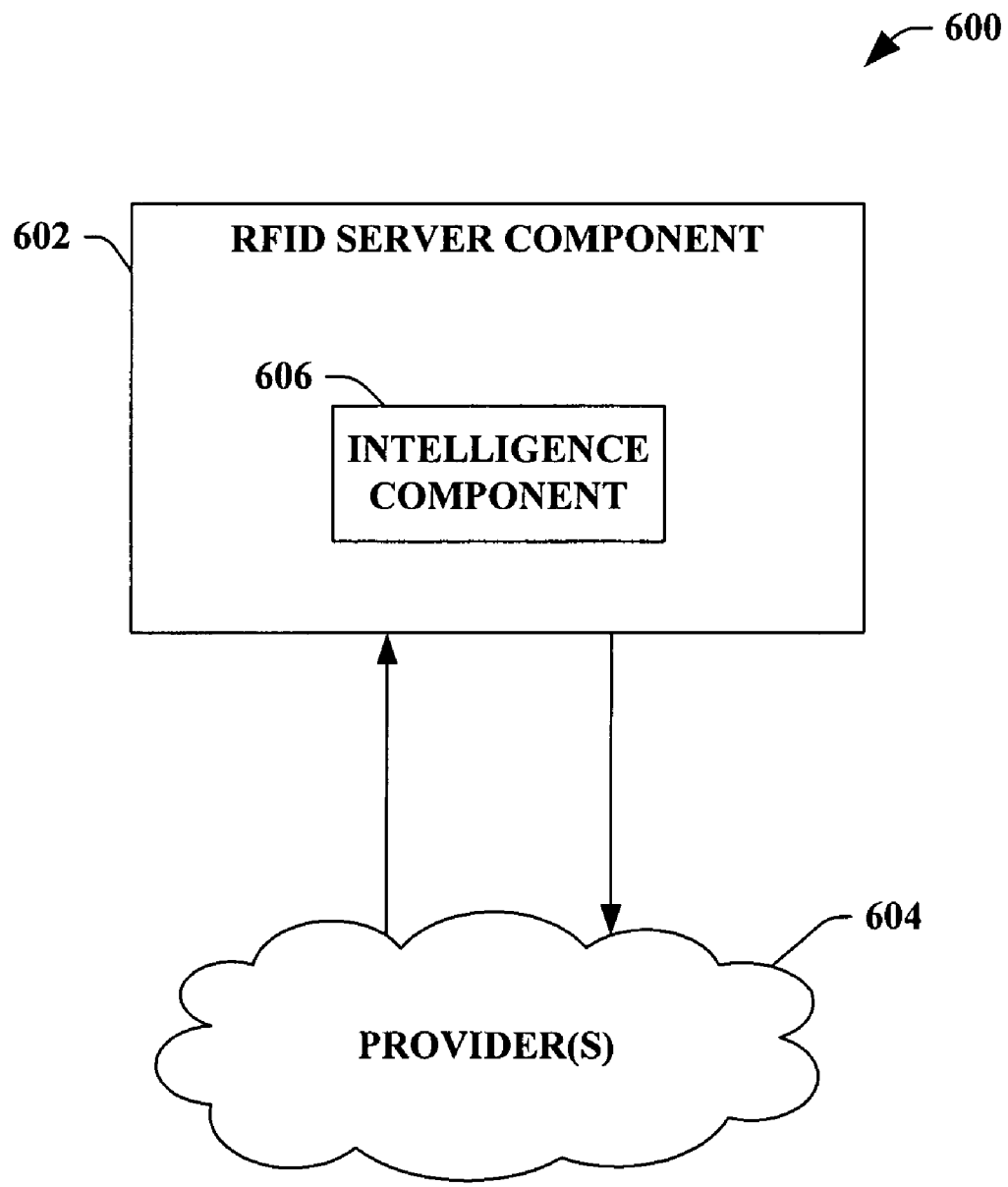
FIG. 6 illustrates a block diagram of an exemplary system that facilitates implementing an RFID server component.

FIG. 6 illustrates a system 600 that employs intelligence (e.g., machine learning) to facilitate implementing an RFID server component 602. The system 600 includes the RFID server component 602, which can provide an RFID process to a provider(s) 604. The RFID server component 602 can receive data relating to at least one provider, wherein such data facilitates employing an RFID process to a particular provider. In addition, the RFID server component 602 can invoke an intelligence component 606 to facilitate such employment of an RFID process. Upon receiving data relating to a particular provider, the intelligent component 606 can facilitate implementing an RFID process to such provider. It is to be appreciated that although the intelligence component 606 is illustrated within the RFID server component 602, the intelligence component 606 is not so limited. In other words, the intelligence component 606 can be incorporated into the RFID server component 602, any component within the REID server component 606, a stand-alone unit, and/or any combination thereof.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention. Furthermore, it is to be appreciated that inferences made in connection of the subject invention can be via an inference based rule engine.

Figure 7:
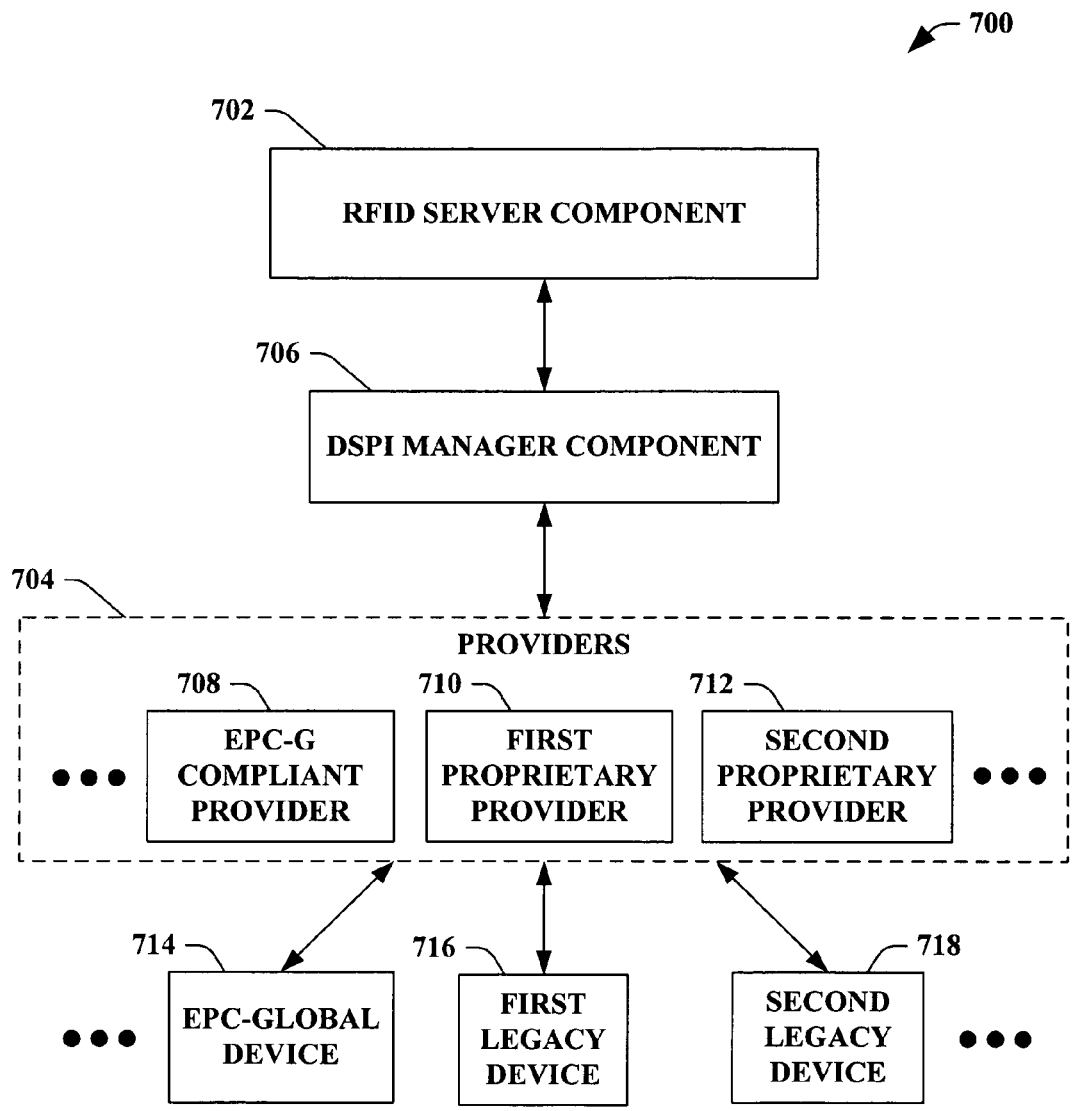
FIG. 7 illustrates a block diagram of an exemplary system that employs an RFID server to execute an RFID process with a plurality of devices and associated providers.

FIG. 7 illustrates a system 700 that facilitates utilizing an RFID server component 702 in conjunction with a DSPI manager component 706 to provide uniform communication and management for a plurality of devices and associated providers. Providers 704 can include a plurality of providers such as an EPC-G compliant provider 708, a first proprietary provider 710, and a second proprietary provider 712. It is to be appreciated that the providers 704 enable service to an associated device. For instance, the EPC-G compliant provider 708 can be associated to an EPC-Global device 714, the first proprietary provider 710 can be associated to a first legacy device 716, and the second proprietary provider 712 can be associated to a second legacy device 718. It is to be appreciated that a DSPI manager component 706 interacts through one of the existing providers 704 for the associated device (e.g., the EPC-Global device 714, the first legacy device 716, and/or the second legacy device 718) via a DSPI component (not shown). The DSPI component (not shown) provides a uniform manner in which the providers 704 provide services to middleware products as each device supports a different set of commands. In other words, the DSPI component (not shown) defines interfaces for device vendors (e.g., and associated devices) to uniformly provide services to an RFID server component 702.

Figure 8:
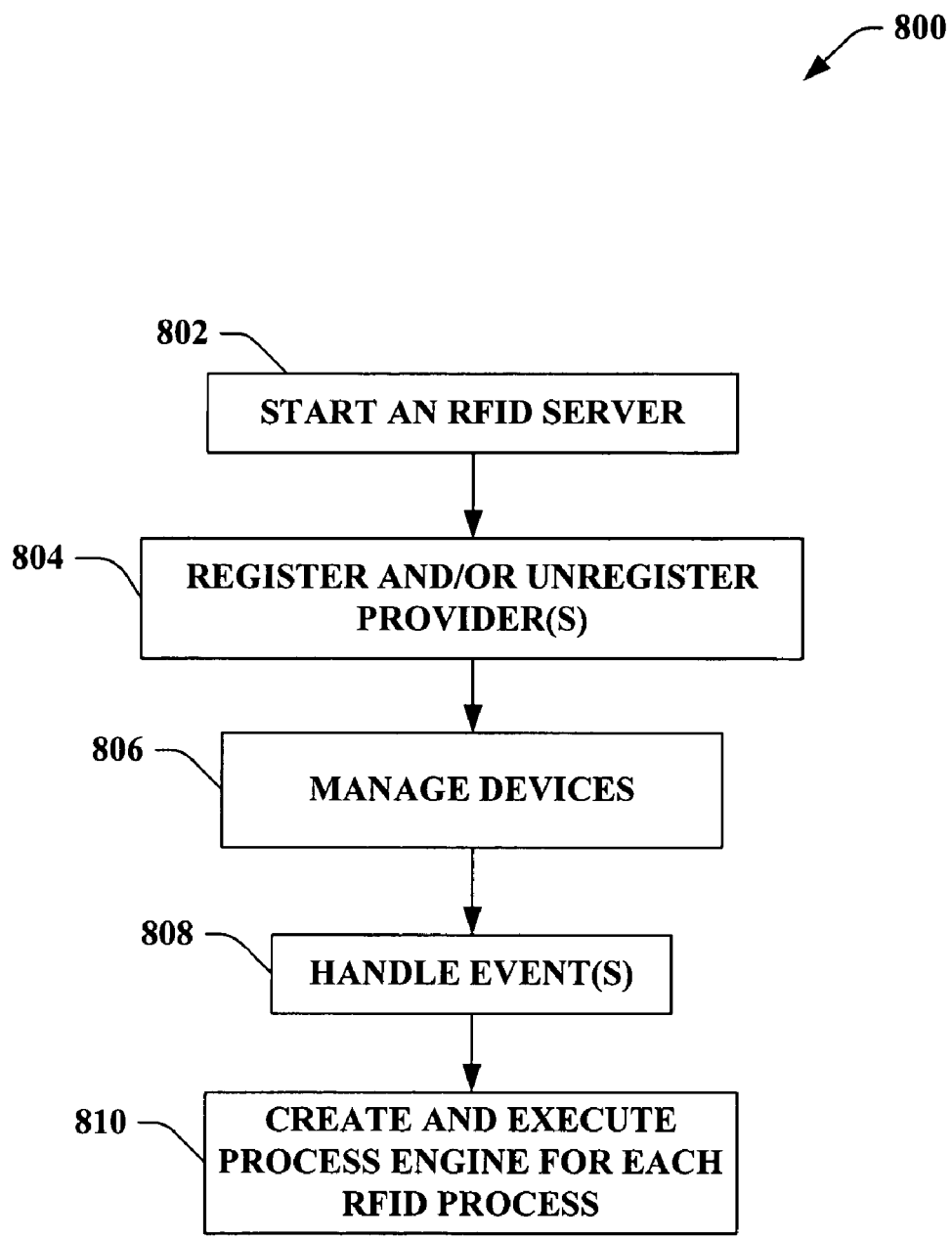
FIG. 8 illustrates an exemplary flow chart for employing an RFID server.
Figure 9:
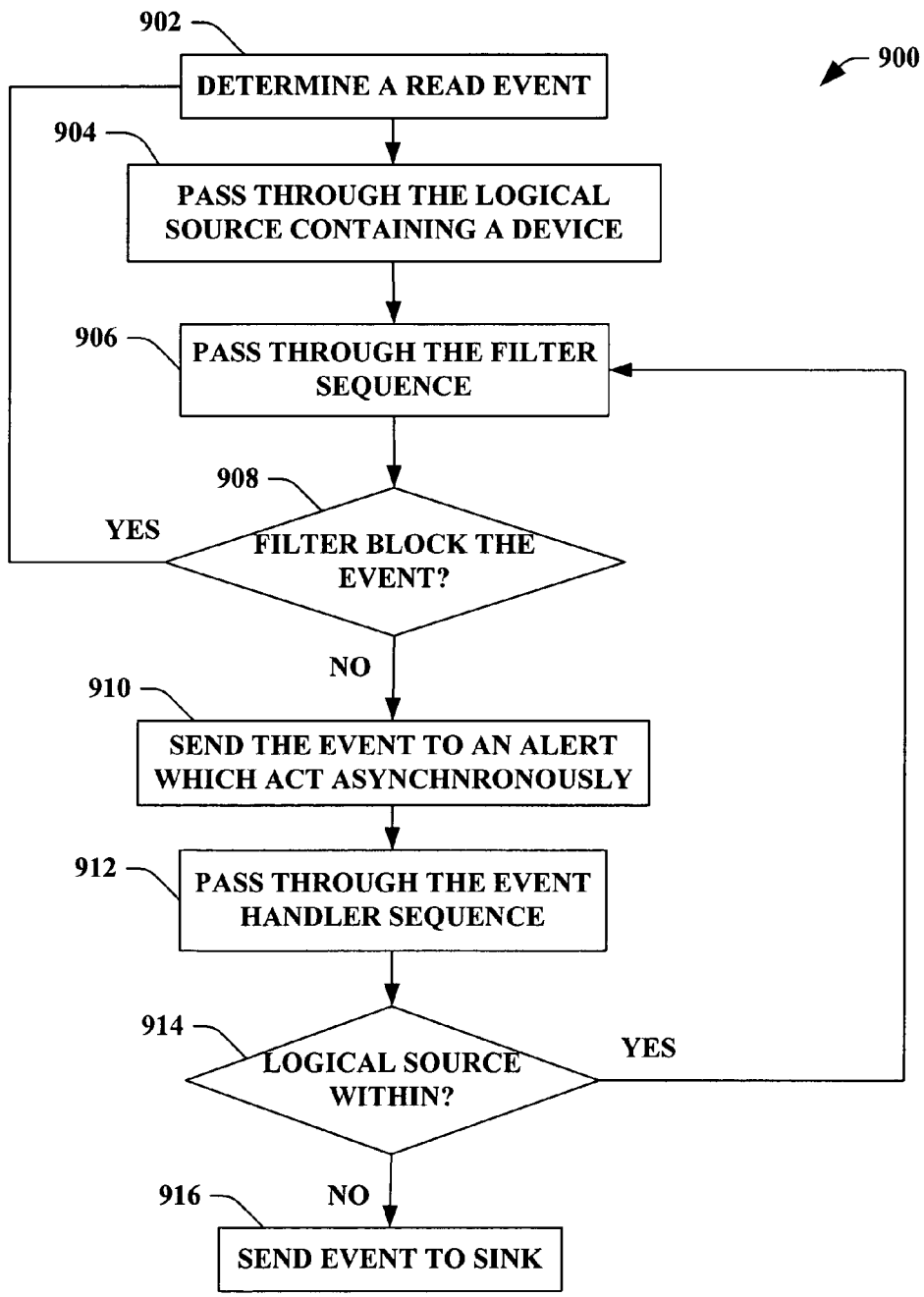
FIG. 9 illustrates an exemplary flow chart for determining and implementing an event.
Figure 10:
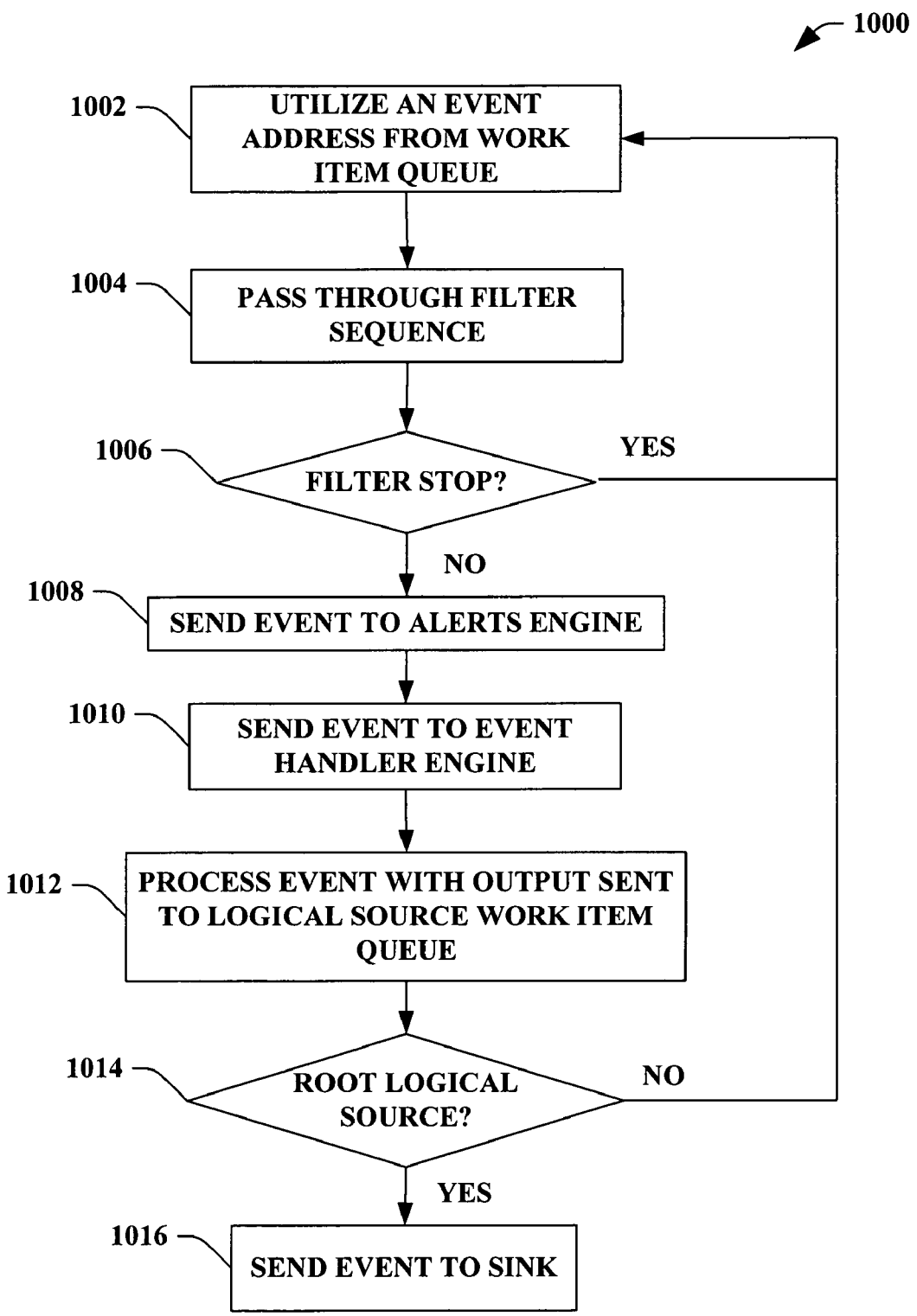
FIG. 10 illustrates an exemplary methodology that facilitates determining and implementing an event.

FIGS. 8-10 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 8 illustrates a methodology 800 that facilitates implementing an RFID server component that allows an RFID process to be executed for at least one provider. At reference numeral 802, the RFID server is started. The RFID server can be implemented by a server manager component that provides the creation and/or destruction of components within and associated to the RFID server. In other words, the server manager component is a bootstrap component that creates any component within a required order. In one example, the RFID server can be started and shutdown in conjunction with a startup and a shutdown of an operating system service. Next, at reference numeral 804, the provider is registered and/or unregistered. In order for an RFID process to be executed, the provider (that which the process is to be executed upon) can be registered with the RFID server. In addition to registration activities, drivers are loaded and/or unloaded to the server. It is to be appreciated and understood that a provider must be registered in order for devices contained within such providers can be utilized.

Next, at 806, devices are managed based at least upon such devices being contained within a registered provider. Providers can relate to a particular device such as, but are not limited to, RFID devices with associated configuration settings. Such management of devices can include, but is not limited to, connection maintenance, device availability, discovery, device object management, synchronous call management, etc. At reference numeral 808, events are handled. The events emanating from the devices (e.g., RFID readers, RFID writers, a sensor, . . . ) and the device manager component. Such events can be, but are not limited to, tag reads, tag read/write errors, device up/down events, etc. The handling of such events can include, but are not limited to, subscription to events, delivery of the events to a subscriber, writing events to a message queuing center, etc. At reference numeral 810, an RFID process is created and executed by a process engine for at least one provider that relates to the device(s). It is to be appreciated that there can be a plurality of RFID processes for a single provider, and that there can be a plurality of providers corresponding to a single RFID server component.

FIG. 9 illustrates a methodology 900 that facilitates employing an RFID process utilizing an RFID process engine in conjunction with a tag-based flow. It is to be appreciated that the methodology 900 utilizes a set of threads for every RFID process engine, wherein each thread does a substantially similar job as discussed below. At 902, a read event is determined. For instance, a read event can be selected from a queue (e.g., an RFID process engine queue). At reference numeral 904, a logical source containing a device is utilized. The thread can pass through the logical source, which can contain a device that created such event. Next at 906, the thread is passed through the filter sequence. Continuing at 908, if while passing through the filter sequence, a filter blocks the event, the process continues at 902, while if no filter blocks the event, the process proceeds to 910. At reference numeral 910, the event is sent to an alert. When the event is sent to an alert, the alert can act upon the event synchronously and/or asynchronously. At 912, the thread is passed through the event handler sequence, wherein the output event of the final event handler is the output of the logical source. If at reference numeral 914 a logical source is within the logical source that the thread is currently passing, then the process continues at 906. If there is not a logical source with the current logical source, then at 916, the event is sent to a sink.

FIG. 10 illustrates a methodology 1000 that facilitates employing an RFID process utilizing an RFID process engine in conjunction with a logical source-based flow (e.g., pipelined flow). It is to be understood that within the methodology 1000, every logical source is a live entity and each step is done repeatedly. Starting with reference numeral 1002, an event address is utilized from a queue such as, but is not limited to, work item queue. Next at 1004, the event is passed through a filter sequence. If a filter stops the event at 1006, the method continues at 1002. If no filter stops the event, the process continues at 1008, where the event is sent to a rules engine. The rules engine can start acting upon the event asynchronously. At reference numeral 1010, the event is sent to an event handler engine, wherein the event can be acted upon asynchronously. Next at reference numeral 1014, a determination is made whether the logical source is the root logical source. If the not a root logical source, the process continues at 1002. If the logical source is the root logical source, the event is sent to a sink at 1016. It is to be appreciated that the event handler engine can process the event received and transmit the associated output to the logical source queue (e.g., work item queue) addressed to a parent logical source.

Figure 11:
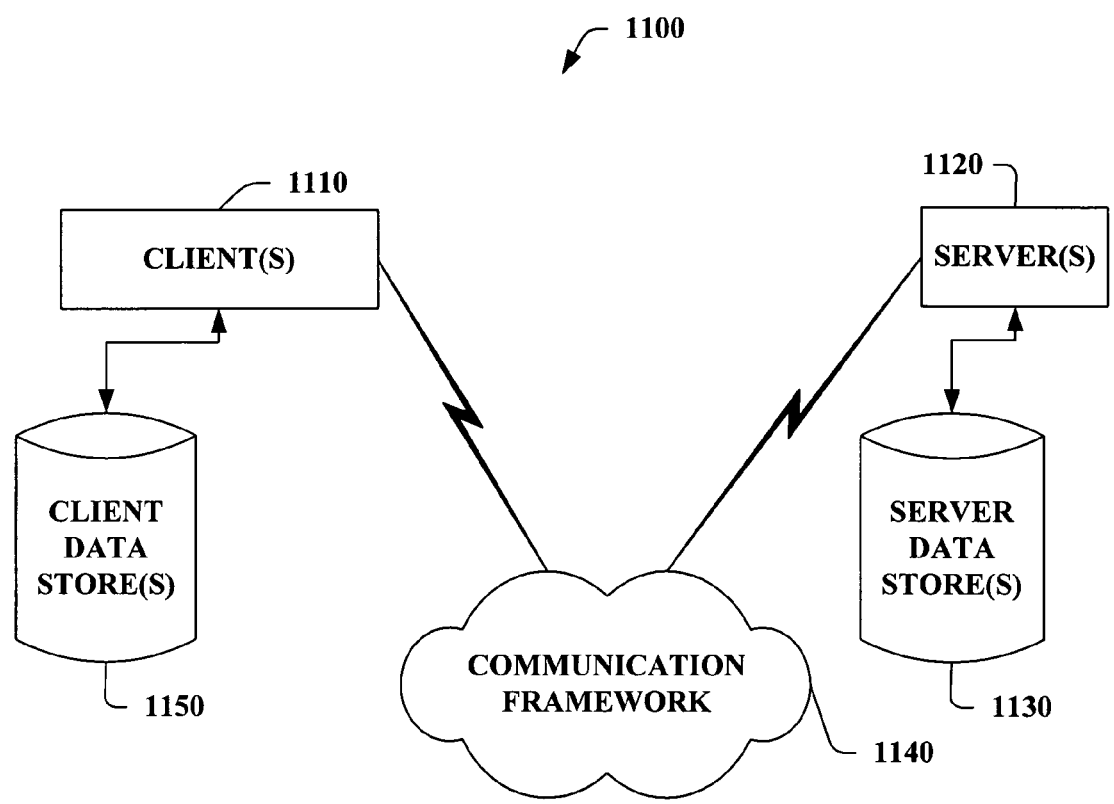
FIG. 11 illustrates an exemplary networking environment, wherein the novel aspects of the subject invention can be employed.
Figure 12:
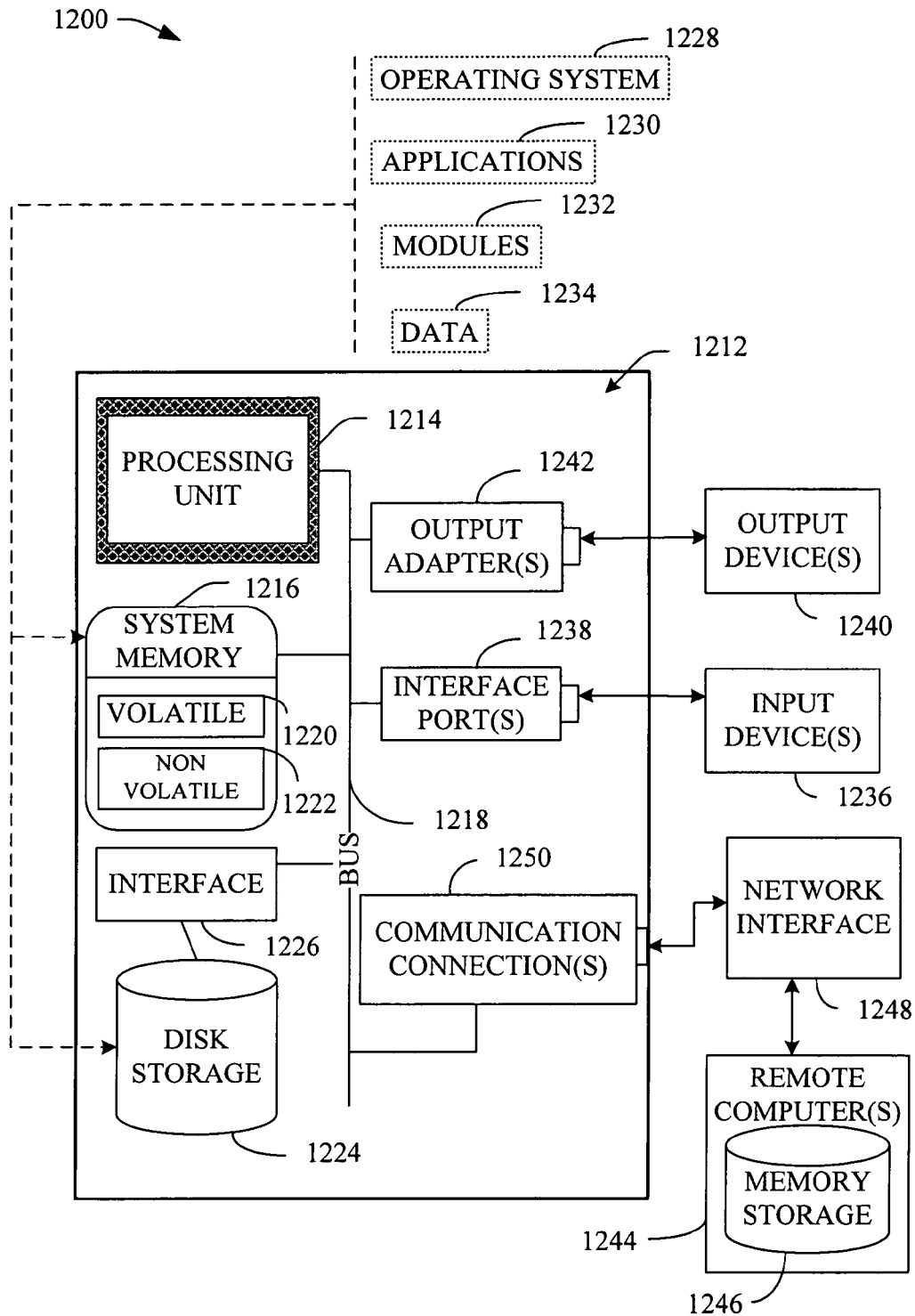
FIG. 12 illustrates an exemplary operating environment that can be employed in accordance with the subject invention.

In order to provide additional context for implementing various aspects of the subject invention, FIGS. 11-12 and the following discussion is intended to provide a brief, general description of a suitable computing environment in which the various aspects of the subject invention may be implemented.

While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject invention, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but is not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but are not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 139.4), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but is not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates implementing an RFID process by providing creation and/or execution of the RFID process as it relates to a provider and associated devices related to the provider, the system comprising one or more computer processors, system memory, and recorded computer-executable instructions, the system further comprising:
   a component that receives information relating to at least one or more providers; and
   an RFID server component that employs the information in connection with providing an RFID process that can be applied generically to a plurality of devices associated with a subset of the providers, the RFID server component enabling: (1) a separation of a logical representation of the device and a physical representation of the device; (2) a write-once independent software vendor model that can utilize an event processing tree to deploy in different environments with different device topologies; (3) a user to define and author a business process to detect, consume and act upon the RFID event; (4) a separation of design time, a deployment time, and execution time utilizing a binding model; and (5) an RFID engine to execute the RFID process as a web-service, wherein process deployment/provisioning is transparent.

2. The system of claim 1, further comprising a device service provider interface (DSPI) component that facilitates uniform communication between at least one of the devices and the RFID server component, wherein the DSPI component is managed and provides at least one of: a registration to the RFID server component; unregistration to the RFID server component; a driver load; and a driver unload.

3. The system of claim 1, further comprising the RFID engine that processes an RFID event including the event processing tree that abstracts a logical entity, wherein the logical entity consists of a logical source that can be can be at least one of the following to define the RFID process: a tag data source; a filter; a rule; an alert; an event handler; a tracking option; and a sink.

4. The system of claim 1, further comprising an RFID process manager component that contains an RFID process engine that executes at least one of the following RFID processes: (1) providing authorization with a security manager component; (2) loading the RFID process from a data store; (3) opening device connection; (4) applying a configuration setting on the device; (5) subscribing an event with an event routing engine (ERE) component; (6) interpreting a logical source and associated flow; and (7) executing the logical source.

5. The system of claim 1, further comprising a general purpose rules engine that receives an event from a worker thread in order to asynchronously execute multiple incoming events, for filtering and an alerting.

6. The system of claim 1, further comprising a device manager component that manages the device through at least one of the following: (1) opening a connection to the device; (2) maintaining a connection to the device, re-establishing a connection, (3) implementing an event; connecting to a discovered device; polling the device; (4) storing a device object that represents the device; and (5) handling a synchronous call to the device.

7. The system of claim 1, further comprising an ERE component that subscribes and delivers an event to a subscriber, wherein the event is one of the following: (1) a tag read event; (2) a tag read error; (3) a tag write error; (4) a device up event; (5) a device down event; and (6) a management event.

8. The system of claim 1, further comprising a server manager component that controls a lifecycle of the RFID server component in relation to an operating system service.

9. The system of claim 1, further comprising a security manager component that provides authorization for the RFID server component, wherein the authorization is one of the following: (1) a permission authorization to execute the RFID process; (2) a permission authorization to add an object to a data store; (3) a permission authorization to modify an object to a data store; (4) a permission authorization to delete an object to a data store; and (5) a permission to configure an object to a data store.

10. The system of claim 1, further comprising a design handler component that implements device discovery and property discovery, which includes one of the following: (1) receiving a device discovery event; (2) aggregating a device discovery event; (3) removing a device based upon invalidity of the device; and (4) returning a set of non-configured devices.

11. A tangible computer readable storage medium having stored thereon computer-executable instructions for implementing the components of the system of claim 1.

12. The system of claim 1, the RFID server component utilizes a programming language that is one of the following: C#, extensible markup language, and hypertext markup language.

13. A computer-implemented method that facilitates executing an RFID process, the method performed at least by executing computer-executable instructions upon one or more computer processors, the method comprising:
   receiving information relating to at least one or more providers; and
   employing the information in connection with providing an RFID process that can be applied generically to a plurality of devices associated with a subset of the providers, wherein employing the information includes:
      separating a logical representation of the device and a physical representation of the device;
      writing an independent software model once to be utilized with an event processing tree to deploy in different environments with different device topologies
      defining and authoring a business process to detect, consume and act upon the RFID event;
      separating a design time, a deployment time, and an execution time utilizing a binding model; and
      executing the RFID process as a web-service, wherein process deployment/provisioning is transparent to an end user.

14. The method of claim 13, further comprising utilizing an RFID engine that processes an RFID event including the event processing tree that abstracts a logical entity, wherein the logical entity can be at least one of the following to define the RFID process: a tag data source; a filter; a rule; an alert; an event handler; a tracking option; and a sink.

15. The method of claim 13, further comprising:
   determining a read event;
   utilizing a logical source containing a device;
   employing a filter sequence to data of the device;
   sending the event to an alert to evaluate against data of the device;
   utilizing an event handler sequence;
   sending the event to a sink to implement the event; and
   sending the event to another process via a web-service interface.

16. The method of claim 13, further comprising:
   utilizing an event that is addressed to a logical source from a queue;

passing the event through a filter sequence;
sending the event to an event handler engine;
processing the event and sending it to a queue;
determining if the logical source is a root logical source; and
sending the event to a sink to implement the event.

17. A computer-implemented system that facilitates implementing an RFID process, the system comprising one or more computer processors, system memory, and recorded computer-executable instructions, the system further comprising:
means for receiving information relating to a provider; and
means for employing the information in connection with providing an RFID process that can be applied generically to a plurality of devices associated with a subset of the providers, wherein employing the information includes enabling: (1) a separation of a logical representation of the device and a physical representation of the device; (2) a write-once independent software vendor model that can utilize an event processing tree to deploy in different environments with different device topologies; (3) a user to define and author a business process to detect, consume and act upon the RFID event; (4) a separation of design time, a deployment time, and execution time utilizing a binding model; and (5) an RFID engine can execute the RFID process as a webservice, wherein process deployment/provisioning is transparent.

* * * * *